United States Patent [19]

Kiunke et al.

[11] Patent Number: 5,363,235
[45] Date of Patent: Nov. 8, 1994

[54] DUAL FIELD OF VIEW MULTI WAVELENGTH SENSOR

[75] Inventors: Pul C. Kiunke, Long Beach; Reynold S. Kebo, Los Angeles; Chungte W. Chen, Irvine, all of Calif.

[73] Assignee: Hughes Aircraft Company, Los Angeles, Calif.

[21] Appl. No.: 15,941

[22] Filed: Feb. 10, 1993

[51] Int. Cl.$^5$ ................ G02B 17/00; G02B 23/00
[52] U.S. Cl. ................ 359/365; 359/366; 359/364; 359/351; 359/355; 359/356; 359/357; 359/399; 359/400
[58] Field of Search ......... 359/350, 351, 355–357, 359/362–366, 399, 400, 402, 403

[56] References Cited

U.S. PATENT DOCUMENTS

| | | | |
|---|---|---|---|
| 3,858,046 | 12/1974 | Cubalchini | 250/353 |
| 4,199,217 | 4/1980 | Rogers | 359/353 |
| 4,432,596 | 2/1984 | Campbell et al. | 359/351 |
| 4,453,800 | 6/1984 | Fjeldsted | 359/351 |
| 4,558,222 | 12/1985 | Neil | 250/353 |
| 4,768,869 | 9/1988 | Mercado | 359/366 |
| 4,989,962 | 2/1991 | Kebo | 359/356 |
| 5,009,494 | 4/1991 | Iossi et al. | 359/859 |
| 5,044,706 | 9/1991 | Chen | 359/357 |
| 5,144,476 | 9/1992 | Kebo | 359/366 |
| 5,173,801 | 12/1992 | Cook | 357/365 |
| 5,227,923 | 7/1993 | Kebo | 359/859 |
| 5,229,880 | 7/1993 | Spencer et al. | 359/353 |
| 5,257,133 | 10/1993 | Chen | 359/565 |
| 5,287,218 | 2/1994 | Chen | 359/365 |

*Primary Examiner*—Eugene R. LaRoche
*Assistant Examiner*—Andrew Q. Tran
*Attorney, Agent, or Firm*—Michael W. Sales; Wanda K. Denson-Low

[57] ABSTRACT

An optical system (10) includes a three mirror anastigmat telescope (12) and imager optics (14). The imager optics (14) provide narrow and wide field of view staring of the viewed scene. The optical system is positioned in a turret assembly (50) and folded to provide a sensor. The sensor includes an output laser beam generator (90). The telescope (12) is shared by the infrared system and the laser (90) to provide a simplistic and compact turret arrangement (50) which is well suited for aircraft targeting and designation purposes.

7 Claims, 5 Drawing Sheets

DUAL FIELD OF VIEW MULTI WAVELENGTH SENSOR

BACKGROUND OF THE INVENTION

1. Technical Field

The present invention relates to an optical sensor and, more particularly, to a dual field of view multi wavelength sensor.

2. Discussion

The performance of conventional high quality telescopes, when used on the earth for celestial viewing, is principally limited to the earth's atmosphere rather than the construction of the telescope. Atmospheric effects not only limit the resolution of telescopes, but also absorb large portions of the electro magnetic spectral range. While in the past very little could be done about this limitation, today, with the help of earth satellites and other space vehicles, it is possible to place a telescope above the atmosphere and perform extraterrestrial observations without interference from it. As a result, there has arisen a need for telescopes which can more fully take advantage of the new environment. Also, it should be understood that the invention may be utilized for other airborne or ground based applications that require viewing distant objects.

In sensors which are required for targeting and designation, usually several telescopes are used. Generally one telescope is used to scan the target, one to provide a laser output for designating targets, and possibly another to provide a visible scanning function. Thus, in an aircraft utilizing such a system, a number of telescopes is utilized to provide each function.

The plurality of telescopes leads to increased weight, increased complexity and increased size requirement for the system. Types of systems which utilize an all turreted forward looking infrared system like that above are the A-6 Target Recognition Attack Multisensor/Detecting and Ranging Set (A-6 TRAM/DRS), Night Vision Systems (NVS), Advanced Electro-optical Special Operation Platform (AESOP), Target Acquisition Designation Sight (TADS), Cobra Nightsight (C-NITE), Low Altitude Navigation and Targeting Infra-Red System for Night (LANTIRN) and AAS38 (F/A-18 FLIR). The major disadvantage of the systems, as mentioned above, is that they require a forward looking infrared sensor providing infrared sensing and an additional designator. Also, the systems are complex due to the utilization of a half angle mirror drive.

Thus, it is desirable to have a system which would utilize a common telescope for all functions. Also, the telescope would be less complex by eliminating the half angle drive assembly.

SUMMARY OF THE INVENTION

According to the teachings of the present invention, a system is provided which enables a common aperture shared telescope to be used for targeting, designation and possibly visual sensing. The invention provides a compact arrangement for the multiple sensors. The present invention avails itself to be retro-fitted to enable updating of presently used sensors in fixed wing aircraft, RPVs and possibly commercial aircraft. The present invention also provides two color optics and a fine stabilization in a gimballed arrangement in a compact configuration. The forward all reflective telescope is shared by the infrared system and the laser, the optical folding arrangement of the telescope permits cross axis motion of the telescope/gimbal necessary for fine stabilization. Cross axis motion is accomplished without a half angle mirror relationship common to this type of sensor gimballing. Also, the field of view switching concept preserves entrance pupil and aperture stop geometry in both fields of view.

In the preferred embodiment, the optical system is comprised of an afocal three mirror anastigmat telescope to provide a magnified image of the scene. The three mirror anastigmat is positioned to receive light energy from the viewed scene. Imager optics provide multi field of view imagery of the viewed scene. The imager optics are positioned to receive light energy from the three mirror anastigmat. The imager optics include a plurality of lenses positionable into the light energy to provide the multi field of view images. Also, optionally, a laser, which generates an output beam, is associated with the three mirror anastigmat and imager optics such that the three mirror anastigmat is common to the laser and the imager optics. The laser generates an output beam which is reflected through the three mirror anastigmat and directed toward the viewed scene.

BRIEF DESCRIPTION OF THE DRAWINGS

The various advantages of the present invention will become apparent to those skilled in the art after a study of the following specification and by reference to the drawings in which.

DETAILED DESCRIPTION OF THE PREFERRED EMBODIMENT

Figure 1:
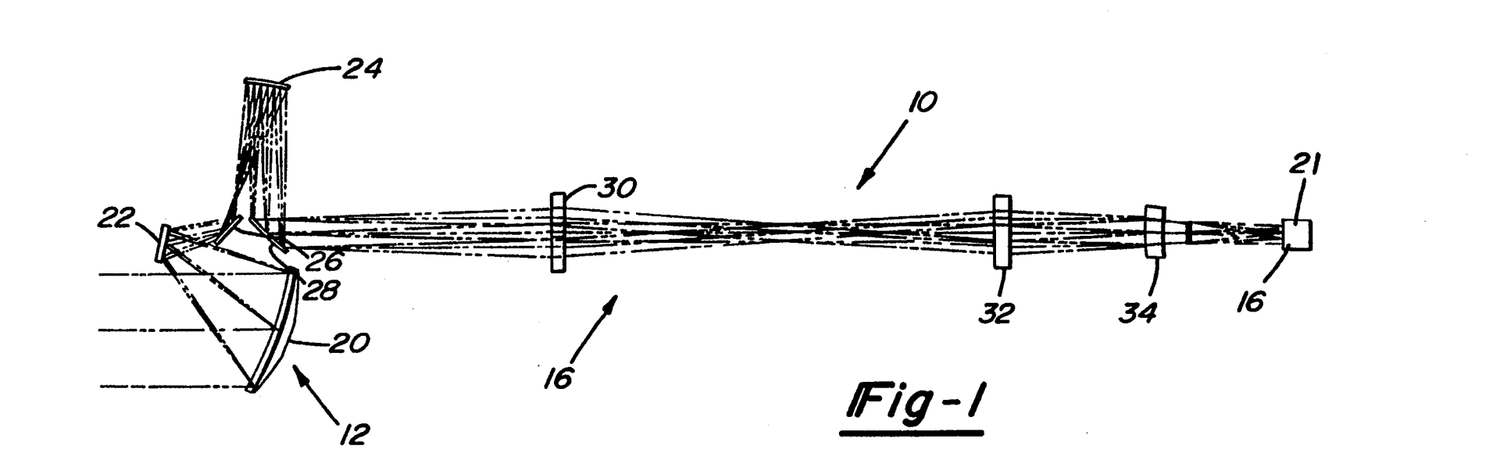
FIG. 1 is an unfolded vertical ray trace of an optical system in accordance with the present invention.
Figure 2:
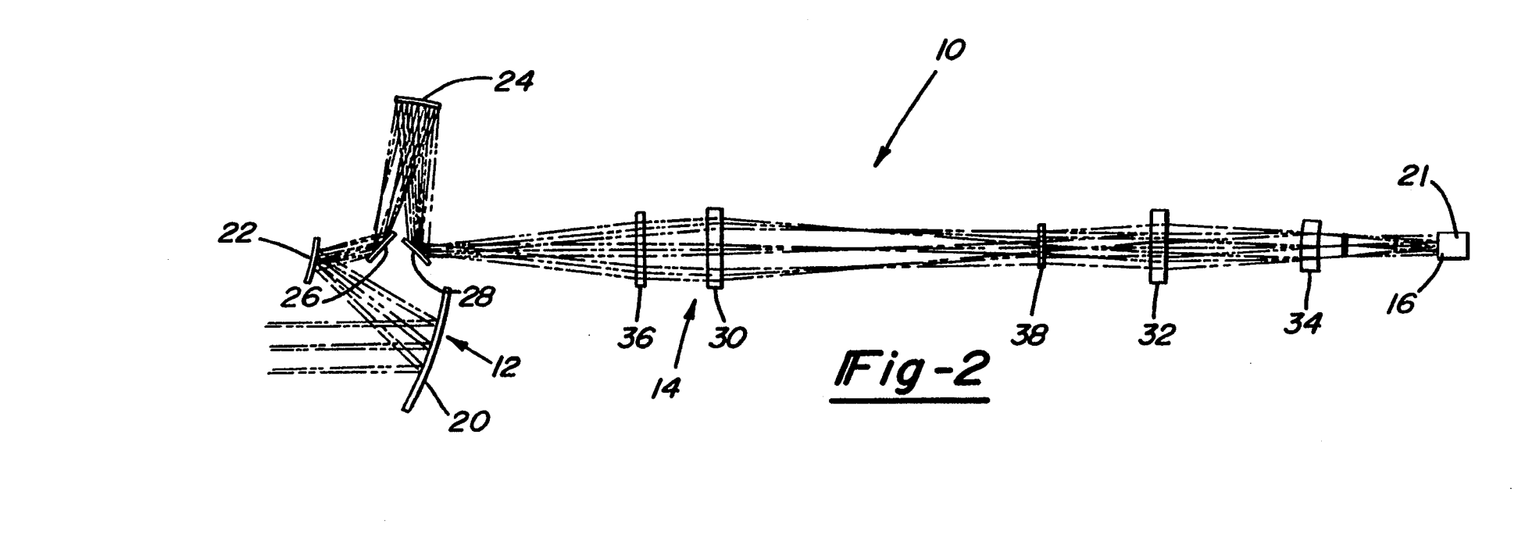
FIG. 2 is a view like FIG. 1 with an additional pair of lenses in accordance with the present invention

Turning to the figures, particularly FIGS. 1 and 2, the optical system is illustrated and designated with the reference numeral 10. The optical system 10 includes a telescope 12 and imager optics 14. The system views a scene and focuses the image of the scene onto a viewing plane 16. A staring detector array 21 may be positioned at the viewing plane to view the scene.

The all reflective telescope 12 is an on axis, in field angle, three mirror anastigmat with decentered entrance and exit pupils. The three mirror anastigmat includes a primary mirror 20, a secondary mirror 22 and a tertiary mirror 24. Also, a pair of fold mirrors 26 and 28 direct the energy. The primary 20, secondary 22 and tertiary 24 mirrors generally have a conic surface, although higher order aspheric mirror surfaces may be used. Generally, the primary 20 and tertiary 24 mirrors are positive power mirrors, while the secondary mirror 22 is negative power.

The three mirror anastigmat telescope 12 magnifies and reimages an afocal image of the viewed scene. The image of the scene is reflected from the fold mirror 28 towards the imager optics 14. In FIG. 1, the imager optics 14 are in a narrow field of view mode. In the narrow field of view mode, the imager optics 14 include lenses 30, 32 and 34. Lens 30 is a positive silicon objective lens with an aspheric surface. The lens 32 is a positive power silicon lens with spherical surfaces. Lens 34 is a positive germanium element with a diffractive optical surface.

The diffractive optical surface on lens 34 simultaneously corrects the primary axial chromatic aberration, spherochromatism and reduces field curvature for the dual field of view (the narrow field of view and wide field of view) imager. Without the use of a diffractive optical surface, the chromatic aberrations for the narrow field of view imager resulting from lenses 30 and 32 are too severe to be corrected by any simple follow-on optical element such as lens 34. Similarly, the chromatic aberrations for the wide field of view imager resulting from lenses 30, 32, 36 and 38 are too large to be corrected by any simple follow-on optical element such as lens 34. Additionally, the ability of a diffractive optical surface to correct large primary and higher order chromatic aberrations enables an optical designer to use high index of refraction, high dispersion glass materials (low Abbe number) for positive optical power lenses. Consequently, the field curvature is flattened and the higher order aberrations are significantly reduced. The unique nature associated with a diffractive optical surface described above is particularly critical in designing dual field of view of multiple field of view optical systems, wherein the intrinsic aberrations associated with each optical element have to be minimized. Otherwise, the aberration correction across the entire field of view for either dual or multiple field optical systems will be difficult to achieve.

The wide field of view imager optics include the narrow field of view imager lenses 30, 32 and 34 along with two additional lenses 36 and 38. The lenses 36 and 38 are positioned in front of lenses 30 and 32, respectively, to change the system into its wide field of view mode. The lens 36 is a positive germanium lens while the lens 38 is a negative silicon lens, and both lenses have spherical surfaces.

With the lenses 36 and 38 positioned in front of lenses 30 and 32, respectively, the lenses 36 and 38 enable the system to change from a narrow field of view imager to a wide field of view imager. The positive lens 36 in combination with the objective lens 30 yields a shorter focal length for the newly formed wide field of view objective. The lens 38 is in a telephoto combination with the lens 32 and forms a longer focal length relay lens. The insertion of the two lenses 36 and 38 into the narrow field of view imager decreases the overall imager focal length by a factor of 2.5×. Since the F number and cold stop size are fixed, the entrance pupil is also decreased by a factor of 2.5×. With a fixed detector array size, the field of view is increased by a factor of 2.5×. The position and power of lens 38 maintains the entrance and cold stop position in both field of view modes. The afocal telescope 12 is designed to cover the increased field of view of the wide field of view imager with small entrance pupil and reduced field of view and larger entrance pupil of the narrow field of view imager.

Figure 8:
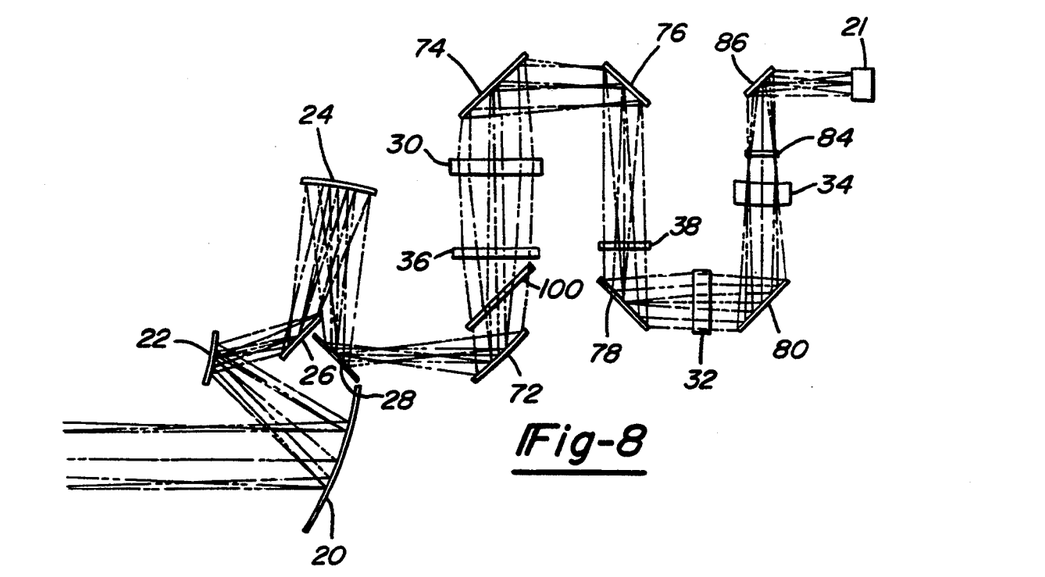
FIG. 8 is a ray trace view of the optical elements of the invention in a wide field of view mode.
Figure 9:
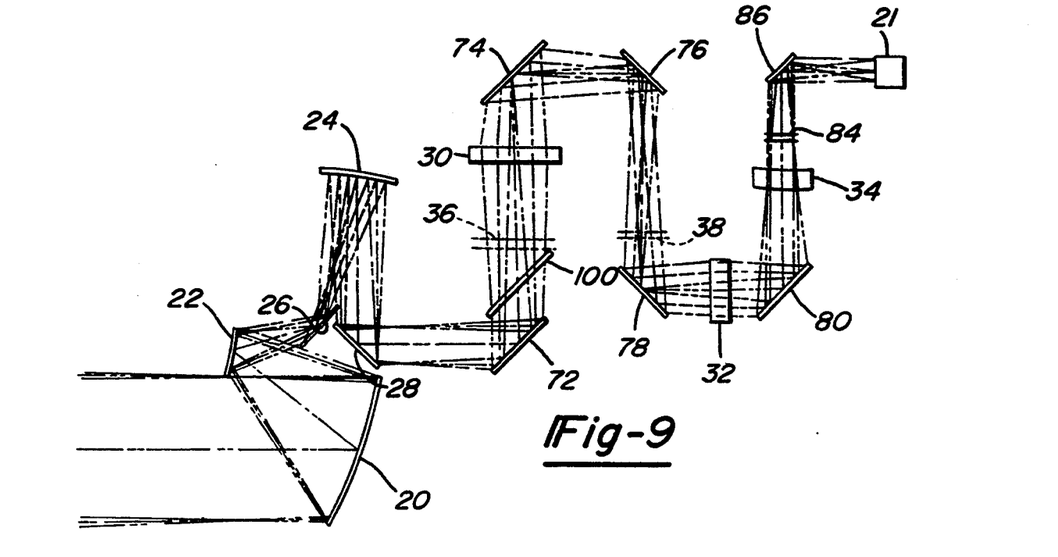
FIG. 9 is a ray trace view of the optical elements of the invention in a narrow field of view mode.

A specific prescription for the system as shown in FIGS. 8 and 9 in accordance with the present invention is as follows:

TABLE 1

| | | | (WFOV TELESCOPE MODE) | | | | |
|---|---|---|---|---|---|---|---|
| REF # | SURF | RD | TH | MEDIUM | RN | DF | VNUM |
| | 0 | 0.000000E+00 | 0.974238E+10 | air | | | |
| | 1 | 0.000000E+00 | 7.37617 | air | | | |
| 20 | 2 | −8.96062 | −3.48778 | mirror | | | |
| 22 | 3 | −3.20988 | 2.13582 | mirror | | | |
| 26 | 4 | 0.000000E+00 | 0.000000E+00 | mirror | | | |
| | 5 | 0.000000E+00 | −3.39972 | air | | | |
| 24 | 6 | 5.86994 | 4.04167 | mirror | | | |
| | 7 | 0.000000E+00 | 0.000000E+00 | air | | | |
| 28 | 8 | 0.000000E+00 | 0.000000E+00 | mirror | | | |
| | 9 | 0.000000E+00 | 0.000000E+00 | air | | | |
| | 10 | 0.000000E+00 | −1.00000 | air | | | |
| | 11 | 0.000000E+00 | −2.80000 | air | | | |
| 72 | 12 | 0.000000E+00 | 0.000000E+00 | mirror | | | |
| | 13 | 0.000000E+00 | 1.30000 | air | | | |
| 100 | 14 | 0.000000E+00 | 0.120000 | SWIR germ | 4.024359 | 0.000 | 175.2 |
| | 15 | 0.000000E+00 | −0.120000 | air | | | |
| | 16 | 0.000000E+00 | 1.00000 | air | | | |
| 36 | 17 | 27.9897 | 0.200000 | SWIR germ | 4.024359 | 0.000 | 175.2 |
| | 18 | 140.748 | 1.80000 | air | | | |
| 30 | 19 | 66.7983 | 0.381681 | SWIR Si | 3.425444 | 0.000 | 383.6 |
| | 20 | −18.6614 | 1.750000 | air | | | |
| 74 | 21 | 0.00000E+00 | 0.000000E+00 | mirror | | | |
| | 22 | 0.000000E+00 | −3.06250 | air | | | |
| 76 | 23 | 0.000000E+00 | 0.000000E+00 | mirror | | | |
| | 24 | 0.000000E+00 | 3.77863 | air | | | |
| 38 | 25 | −36.7433 | 0.100000 | SWIR Si | 3.425444 | 0.000 | 383.6 |
| | 26 | 23.1699 | 1.28000 | air | | | |
| 78 | 27 | 0.000000E+00 | 0.000000E+00 | mirror | | | |
| | 28 | 0.000000E+00 | −1.70305 | air | | | |
| 32 | 29 | −47.3543 | −0.445294 | SWIR Si | 3.425444 | 0.000 | 383.6 |
| | 30 | 18.3276 | −1.27000 | air | | | |
| 80 | 31 | 0.000000E+00 | 0.000000E+00 | mirror | | | |
| | 32 | 0.000000E+00 | 2.35241 | air | | | |
| 34 | 33 | 5.05913 | 0.508908 | SWIR germ | 4.024359 | 0.000 | 175.2 |
| | 34 | 6.80746 | 0.700067 | air | | | |
| 84 | 35 | 0.000000E+00 | 0.508908E−01 | SWIR germ | 4.024359 | 0.000 | 175.2 |

TABLE 1-continued

|    | 36 | 0.000000E+00 | 1.63000      | air    |
|----|----|--------------|--------------|--------|
| 86 | 37 | 0.000000E+00 | 0.000000E+00 | mirror |
|    | 38 | 0.000000E+00 | −2.17762     | air    |
| 21 | 39 | 0.000000E+00 |              |        |

REFRACTIVE INDICES

| SURF | N1           | N2       | N3       | N4       | N5       |
|------|--------------|----------|----------|----------|----------|
| 14   | 4.024359     | 4.034507 | 4.017245 | 1.000000 | 1.000000 |
| 17   | 4.024359     | 4.034507 | 4.017245 | 1.000000 | 1.000000 |
| 19   | 3.425444     | 3.429057 | 3.422735 | 1.000000 | 1.000000 |
| 25   | 3.425444     | 3.429057 | 3.422735 | 1.000000 | 1.000000 |
| 29   | 3.425444     | 3.429057 | 3.422735 | 1.000000 | 1.000000 |
| 33   | 4.024359     | 4.034507 | 4.017245 | 1.000000 | 1.000000 |
| 35   | 4.024359     | 4.034507 | 4.017245 | 1.000000 | 1.000000 |

CC AND ASPHERIC DATA

| SURF | CC           | AD           | AE           | AF          | AG           |
|------|--------------|--------------|--------------|-------------|--------------|
| 2    | −1.0080      |              |              |             |              |
| 3    | −5.1540      |              |              |             |              |
| 6    | −1.0000      |              |              |             |              |
| 19   | 0.000000E+00 | −0.39486E-03 | 0.77972E-04  | 0.27499E-03 | −0.29620E-03 |
| 34   | −20.042      | 0.82770E-02  | −0.16812E-02 | 0.92811E-03 | 0.15555      |

TILT AND DEC DATA

| SURF | TYPE  | YD       | XD       | ALPHA      | BETA     | GAMMA    |
|------|-------|----------|----------|------------|----------|----------|
| 1    | TILT  | 0.000000 | 0.000000 | 0.000000   | 0.000000 | 0.000000 |
| 2    | TILT  | 0.000000 | 0.000000 | 0.000000   | 0.000000 | 0.000000 |
| 3    | TILT  | 0.000000 | 0.000000 | 0.000000   | 0.000000 | 0.000000 |
| 4    | TILT  | 0.000000 | 0.000000 | −45.000000 | 0.000000 | 0.000000 |
| 5    | TILT  | 0.000000 | 0.000000 | −45.000000 | 0.000000 | 0.000000 |
| 6    | TILT  | 0.000000 | 0.000000 | 0.000000   | 0.000000 | 0.000000 |
| 7    | DEC   | 0.785714 | 0.000000 |            |          |          |
| 8    | TILT  | 0.000000 | 0.000000 | −45.000000 | 0.000000 | 0.000000 |
| 9    | TILT  | 0.000000 | 0.000000 | −45.000000 | 0.000000 | 0.000000 |
| 10   | TILT  | 0.000000 | 0.000000 | 0.000000   | 0.000000 | 0.000000 |
| 12   | TILT  | 0.000000 | 0.000000 | −45.000000 | 0.000000 | 0.000000 |
| 13   | TILT  | 0.000000 | 0.000000 | −45.000000 | 0.000000 | 0.000000 |
| 14   | TILT  | 0.000000 | 0.000000 | 45.000000  | 0.000000 | 0.000000 |
| 16   | RTILT | 0.000000 | 0.000000 | 45.000000  | 0.000000 | 0.000000 |
| 17   | DEC   | 0.069680 | 0.000000 |            |          |          |
| 21   | TILT  | 0.000000 | 0.000000 | 45.000000  | 0.000000 | 0.000000 |
| 22   | TILT  | 0.000000 | 0.000000 | 45.000000  | 0.000000 | 0.000000 |
| 23   | TILT  | 0.000000 | 0.000000 | 45.000000  | 0.000000 | 0.000000 |
| 24   | TILT  | 0.000000 | 0.000000 | 45.000000  | 0.000000 | 0.000000 |
| 27   | TILT  | 0.000000 | 0.000000 | −45.000000 | 0.000000 | 0.000000 |
| 28   | TILT  | 0.000000 | 0.000000 | −45.000000 | 0.000000 | 0.000000 |
| 31   | TILT  | 0.000000 | 0.000000 | −45.000000 | 0.000000 | 0.000000 |
| 32   | TILT  | 0.000000 | 0.000000 | −45.000000 | 0.000000 | 0.000000 |
| 37   | TILT  | 0.000000 | 0.000000 | 45.000000  | 0.000000 | 0.000000 |
| 38   | TILT  | 0.000000 | 0.000000 | 45.000000  | 0.000000 | 0.000000 |

CLEAR APERTURES AND OBSTRUCTIONS

| SURF | TYPE      | CAY     | CAX        | YDEC  | XDEC       | TILT |
|------|-----------|---------|------------|-------|------------|------|
| 2    | RCTK      | 1.8000  | 1.8000     | −3.14 | 0.000E+00  |      |
|      | RACETRACK | RADIUS  | =0.4000000 |       |            |      |
| 3    | RECT      | 0.66786 | 0.66786    | −.731 | 0.000E+00  |      |
| 4    | CIRC      | 0.74000 |            | −.250 | 0.000E+00  |      |
| 6    | RECT      | 0.94286 | 0.94286    | 0.786 | 0.000E+00  |      |
| 8    | CIRC      | 0.76000 |            |       |            |      |
| 12   | CIRC      | 0.90000 |            |       |            |      |
| 14   | CIRC      | 1.0500  |            | −.100 | 0.000E+00  |      |
| 15   | CIRC      | 1.0500  |            | −.100 | 0.000E+00  |      |
| 17   | CIRC      | 1.0500  |            |       |            |      |
| 18   | CIRC      | 1.0500  |            |       |            |      |
| 19   | CIRC      | 1.0814  |            |       |            |      |
| 20   | CIRC      | 1.0814  |            |       |            |      |
| 21   | CIRC      | 1.1000  |            |       |            |      |
| 23   | CIRC      | 0.74000 |            |       |            |      |
| 25   | CIRC      | 0.60000 |            |       |            |      |
| 26   | CIRC      | 0.60000 |            |       |            |      |
| 27   | CIRC      | 0.86000 |            |       |            |      |
| 29   | CIRC      | 0.75000 |            |       |            |      |
| 30   | CIRC      | 0.75000 |            |       |            |      |
| 31   | CIRC      | 0.91000 |            |       |            |      |
| 33   | CIRC      | 0.69975 |            |       |            |      |
| 34   | CIRC      | 0.69975 |            |       |            |      |
| 37   | CIRC      | 0.46000 |            |       |            |      |

PICKUPS

| SURF | TYPE | J | A         | B              |
|------|------|---|-----------|----------------|
| 4    | YD   | 3 | 1.0000000 | 0.00000000E+00 |

TABLE 1-continued

| 16 | ALPHA | 14 | 1.0000000 | 0.00000000E+00 | |
|---|---|---|---|---|---|
| REF OBJ Y-HT | REF AP Y-HT | OBJ SURF | REF SURF | IMG SURF | EVL SURF |
| −0.284893E+09 (1.67 DG) | 0.17500 | 0 | 11 | 39 | 39 |
| EFL | BF | F/NO | LENGTH | GIH | |
| −8.8077994 | 0.00000000E+00 | 6.2912853 | 5.8417319 | 0.24581404 | |

NO APERTURE STOP.
EVALUATION MODE IS FOCAL
PRIMARY CHROMATIC WAVELENGTHS ARE 2 − 3
SECONDARY CHROMATIC WAVELENGTHS ARE 2 − 1

| WAVL NBR | 1 | 2 | 3 | 4 | 5 |
|---|---|---|---|---|---|
| WAVELENGTH | 4.00000 | 3.40000 | 4.80000 | 0.00000 | 0.00000 |
| SPECTRAL WT | 1.0000 | 0.5000 | 0.5000 | 0.0000 | 0.0000 |

116 ZERN ON

| | | | | |
|---|---|---|---|---|
| 0.000000E+00 | 0.000000E+00 | 0.000000E+00 | 28.6141 | 0.000000E+00 |
| 0.000000E+00 | 0.000000E+00 | 0.000000E+00 | 0.000000E+00 | 0.000000E+00 |
| −106.522 | 0.000000E+00 | 0.000000E+00 | 0.000000E+00 | 0.000000E+00 |
| 0.000000E+00 | 0.000000E+00 | 0.000000E+00 | 0.000000E+00 | 0.000000E+00 |
| 0.000000E+00 | 914.588 | −2822.22 | 3062.43 | |

34 HOLO ON

| COLOR | RFCFG | RFISN | OBCFG | OBSIN | MAG | ORDER |
|---|---|---|---|---|---|---|
| 1. | 0. | 0. | 0. | 0. | 6.99749 | 1. |
| THOLO | NVAR | EFF | SIGN | F1SN | F2SN | F3SN | DTOL | PHASE |
| 0.00000 | 0.00000 | 0.00000 | 1. | 0. | 0. | 0. | 0.00000E+00 | 116.0000 |

TABLE 2

(NFOV TELESCOPE MODE)

| REF # | SURF | RD | TH | MEDIUM | RN | DF | VNUM |
|---|---|---|---|---|---|---|---|
| | 0 | 0.000000E+00 | 0.974238E+10 | air | | | |
| | 1 | 0.000000E+00 | 7.37617 | air | | | |
| 20 | 2 | −8.96062 | −3.48778 | mirror | | | |
| 22 | 3 | −3.20988 | 2.13582 | mirror | | | |
| 26 | 4 | 0.000000E+00 | 0.000000E+00 | mirror | | | |
| | 5 | 0.0000000E+00 | −3.39972 | air | | | |
| 24 | 6 | 5.86994 | 4.04167 | mirror | | | |
| | 7 | 0.000000E+00 | 0.000000E+00 | air | | | |
| 28 | 8 | 0.000000E+00 | 0.000000E+00 | mirror | | | |
| | 9 | 0.000000E+00 | 0.000000E+00 | air | | | |
| | 10 | 0.0000000E+00 | −1.00000 | air | | | |
| | 11 | 0.0000000E+00 | −2.80000 | air | | | |
| 72 | 12 | 0.000000E+00 | 0.000000E+00 | mirror | | | |
| | 13 | 0.000000E+00 | 1.30000 | air | | | |
| 100 | 14 | 0.000000E+00 | 0.120000 | SWIR germ | 4.024359 | 0.000 | 175.2 |
| | 15 | 0.000000E+00 | −0.120000 | air | | | |
| | 16 | 0.000000E+00 | 1.00000 | air | | | |
| | 17 | 27.9897 | 0.200000 | air | | | |
| | 18 | 140.748 | 1.80000 | air | | | |
| 30 | 19 | 66.7983 | 0.381681 | SWIR Si | 3.425444 | 0.000 | 383.6 |
| | 20 | −18.6614 | 1.750000 | air | | | |
| 74 | 21 | 0.00000E+00 | 0.000000E+00 | mirror | | | |
| | 22 | 0.000000E+00 | −3.06250 | air | | | |
| 76 | 23 | 0.000000E+00 | 0.000000E+00 | mirror | | | |
| | 24 | 0.000000E+00 | 3.77863 | air | | | |
| | 25 | −36.7433 | 0.100000 | air | | | |
| | 26 | 23.1699 | 1.28000 | air | | | |
| 78 | 27 | 0.000000E+00 | 0.000000E+00 | mirror | | | |
| | 28 | 0.0000000E+00 | −1.70305 | air | | | |
| 32 | 29 | −47.3543 | −0.445294 | SWIR Si | 3.425444 | 0.000 | 383.6 |
| | 30 | 18.3276 | −1.27000 | air | | | |
| 80 | 31 | 0.000000E+00 | 0.000000E+00 | mirror | | | |
| | 32 | 0.0000000E+00 | 2.35241 | air | | | |
| 34 | 33 | 5.05913 | 0.508908 | SWIR germ | 4.024359 | 0.000 | 175.2 |
| | 34 | 6.80746 | 0.700067 | air | | | |
| 84 | 35 | 0.000000E+00 | 0.508908E−01 | SWIR germ | 4.024359 | 0.000 | 175.2 |
| | 36 | 0.000000E+00 | 1.63000 | air | | | |
| 86 | 37 | 0.000000E+00 | 0.000000E+00 | mirror | | | |
| | 38 | 0.000000E+00 | −2.17762 | air | | | |
| 21 | 39 | 0.000000E+00 | | | | | |

REFRACTIVE INDICES

| SURF | N1 | N2 | N3 | N4 | N5 |
|---|---|---|---|---|---|
| 14 | 4.024359 | 4.034507 | 4.017245 | 1.000000 | 1.000000 |
| 19 | 3.425444 | 3.429057 | 3.422735 | 1.000000 | 1.000000 |
| 29 | 3.425444 | 3.429057 | 3.422735 | 1.000000 | 1.000000 |

TABLE 2-continued

| | | | | | |
|---|---|---|---|---|---|
| 33 | 4.024359 | 4.034507 | 4.017245 | 1.000000 | 1.000000 |
| 35 | 4.024359 | 4.034507 | 4.017245 | 1.000000 | 1.000000 |

CC AND ASPHERIC DATA

| SURF | CC | AD | AE | AF | AG |
|---|---|---|---|---|---|
| 2 | −1.0080 | | | | |
| 3 | −5.1540 | | | | |
| 6 | −1.0000 | | | | |
| 19 | 0.00000E+00 | −0.39486E−03 | 0.77972E−04 | 0.27499E−03 | −0.29620E−03 |
| 34 | −20.042 | 0.82770E−02 | −0.16812E−02 | 0.92811E−03 | 0.15555 |

TILT AND DEC DATA

| SURF | TYPE | YD | XD | ALPHA | BETA | GAMMA |
|---|---|---|---|---|---|---|
| 1 | tilt | 0.000000 | 0.000000 | 0.000000 | 0.000000 | 0.000000 |
| 2 | tilt | 0.000000 | 0.000000 | 0.000000 | 0.000000 | 0.000000 |
| 3 | tilt | 0.000000 | 0.000000 | 0.000000 | 0.000000 | 0.000000 |
| 4 | tilt | 0.000000 | 0.000000 | −45.000000 | 0.000000 | 0.000000 |
| 5 | tilt | 0.000000 | 0.000000 | −45.000000 | 0.000000 | 0.000000 |
| 6 | tilt | 0.000000 | 0.000000 | 0.000000 | 0.000000 | 0.000000 |
| 7 | dec | 0.785714 | 0.000000 | | | |
| 8 | tilt | 0.000000 | 0.000000 | −45.000000 | 0.000000 | 0.000000 |
| 9 | tilt | 0.000000 | 0.000000 | −45.000000 | 0.000000 | 0.000000 |
| 10 | tilt | 0.000000 | 0.000000 | 0.000000 | 0.000000 | 0.000000 |
| 12 | tilt | 0.000000 | 0.000000 | −45.000000 | 0.000000 | 0.000000 |
| 13 | tilt | 0.000000 | 0.000000 | −45.000000 | 0.000000 | 0.000000 |
| 14 | tilt | 0.000000 | 0.000000 | 45.000000 | 0.000000 | 0.000000 |
| 16 | rtilt | 0.000000 | 0.000000 | 45.000000 | 0.000000 | 0.000000 |
| 17 | dec | 0.069680 | 0.000000 | | | |
| 21 | tilt | 0.000000 | 0.000000 | 45.000000 | 0.000000 | 0.000000 |
| 22 | tilt | 0.000000 | 0.000000 | 45.000000 | 0.000000 | 0.000000 |
| 23 | tilt | 0.000000 | 0.000000 | 45.000000 | 0.000000 | 0.000000 |
| 24 | tilt | 0.000000 | 0.000000 | 45.000000 | 0.000000 | 0.000000 |
| 27 | tilt | 0.000000 | 0.000000 | −45.000000 | 0.000000 | 0.000000 |
| 28 | tilt | 0.000000 | 0.000000 | −45.000000 | 0.000000 | 0.000000 |
| 31 | tilt | 0.000000 | 0.000000 | −45.000000 | 0.000000 | 0.000000 |
| 32 | tilt | 0.000000 | 0.000000 | −45.000000 | 0.000000 | 0.000000 |
| 37 | tilt | 0.000000 | 0.000000 | 45.000000 | 0.000000 | 0.000000 |
| 38 | tilt | 0.000000 | 0.000000 | 45.000000 | 0.000000 | 0.000000 |

CLEAR APERTURES AND OBSTRUCTIONS

| SURF | TYPE | CAY | CAX | YDEC | XDEC | TILT |
|---|---|---|---|---|---|---|
| 2 | RCTK | 1.8000 | 1.8000 | −3.14 | 0.000E+00 | |
| 3 | RECT | 0.66786 | 0.66786 | −.731 | 0.000E+00 | |
| 4 | CIRC | 0.74000 | | −.250 | 0.000E+00 | |
| 6 | RECT | 0.94286 | 0.94286 | 0.786 | 0.000E+00 | |
| 8 | CIRC | 0.7600 | | | | |
| 12 | CIRC | 0.90000 | | | | |
| 14 | CIRC | 1.0500 | | −.100 | 0.000E+00 | |
| 15 | CIRC | 1.0500 | | −.100 | 0.000E+00 | |
| 17 | CIRC | 1.0500 | | | | |
| 18 | CIRC | 1.0500 | | | | |
| 19 | CIRC | 1.0814 | | | | |
| 20 | CIRC | 1.0814 | | | | |
| 21 | CIRC | 1.1000 | | | | |
| 23 | CIRC | 0.74000 | | | | |
| 25 | CIRC | 0.60000 | | | | |
| 26 | CIRC | 0.60000 | | | | |
| 27 | CIRC | 0.86000 | | | | |
| 29 | CIRC | 0.75000 | | | | |
| 30 | CIRC | 0.75000 | | | | |
| 31 | CIRC | 0.91000 | | | | |
| 33 | CIRC | 0.69975 | | | | |
| 34 | CIRC | 0.69975 | | | | |
| 37 | CIRC | 0.46000 | | | | |

PICKUPS

| SURF | TYPE | J | A | B |
|---|---|---|---|---|
| 4 | YD | 3 | 1.0000000 | 0.00000000E+00 |
| 16 | ALPHA | 14 | 1.0000000 | 0.00000000E+00 |

| REF OBJ Y-HT | REF AP Y-HT | OBJ SURF | REF SURF | IMG SURF | EVL SURF |
|---|---|---|---|---|---|
| −0.113930E+09 (0.67 DG) | −0.43750 | 0 | 11 | 39 | 39 |

| EFL | BF | F/NO | LENGTH | GIH |
|---|---|---|---|---|
| −22.006323 | 0.00000000E+00 | −6.2875210 | 5.8417319 | 0.24647712 |

NO APERTURE STOP.
EVALUATION MODE IS FOCAL
PRIMARY CHROMATIC WAVELENGTHS ARE 2 − 3
SECONDARY CHROMATIC WAVELENGTHS ARE 2 − 1

| WAVL NBR | 1 | 2 | 3 | 4 | 5 |
|---|---|---|---|---|---|

TABLE 2-continued

| WAVELENGTH | 4.00000 | 3.400 | 4.80000 | 0.00000 | 0.00000 |
|---|---|---|---|---|---|
| SPECTRAL WT | 1.0000 | 0.5000 | 0.5000 | 0.0000 | 0.0000 |

| 116 ZERN ON | | | | | |
|---|---|---|---|---|---|
| 0.000000E+00 | 0.000000E+00 | 28.6141 | | 0.000000E+00 | 0.000000E+00 |
| 0.000000E+00 | 0.000000E+00 | 0.000000E+00 | | 0.000000E+00 | 0.000000E+00 |
| −106.522 | 0.000000E+00 | 0.000000E+00 | | 0.000000E+00 | 0.000000E+00 |
| 0.000000E+00 | 0.000000E+00 | 0.000000E+00 | | 0.000000E+00 | 0.000000E+00 |
| 0.000000E+00 | 914.588 | −2822.22 | | 3062.43 | |

| 34 HOLO ON | | | | | | | |
|---|---|---|---|---|---|---|---|
| COLOR | RFCFG | RFISN | OBCFG | OBSIN | MAG | | ORDER |
| 1. | 0. | 0. | 0. | 0. | 6.99749 | | 1. |
| THOLO | NVAR | EFF | SIGN | F1SN | F2SN | F3SN | DTOL | PHASE |
| 0.00000 | 0.00000 | 0.00000 | 1. | 0. | 0. | 0. | 0.00000E+00 | 116.0000 |

[(+) thicknesses are to the right; (+) radii have centers to the right; (+) decenters are up; (+) tilts are counter-clockwise; decenters done before tilts] surface figure departures according to the equation:

$$Z = \frac{c\rho^2}{\sqrt{1 + 1 - (K+1)c^2\rho^2}} + d\rho^4 + e\rho^6 + f\rho^8 + g\rho^{10}$$

where:
Z=surface SAG
C=1/RD
K=CC=Conic Constant=−(Eccentricity)$^2$
$\rho^2 = x^2 + y^2$ Turning to FIGS. 3 through 6, a mechanical layout of the sensor 10 with the optical system folded into a turret 50 is shown. The lower part 52 of the turret 50 is the coarse azimuth gimbal/elevation trunnion, it is cylindrical with a spherical end, supported by ball bearings 101 in the fixed base flange 64 which serves as the interface structure to the platform or vehicle installation. The coarse elevation gimbal 56 is a spherical section with a flat window 54 supported by ball bearings 58 in the azimuth gimbal/elevation trunnion. Coincident with the coarse elevation gimbal is the fine elevation gimbal 62 supported by a flexure 102 on one side and a ball bearing 103 on the opposite side in the coarse elevation gimbal 56. The inner cross axis fine gimbal 104 is supported by ball bearings inside the fine elevation gimbal 62.

Figures 3, 5:
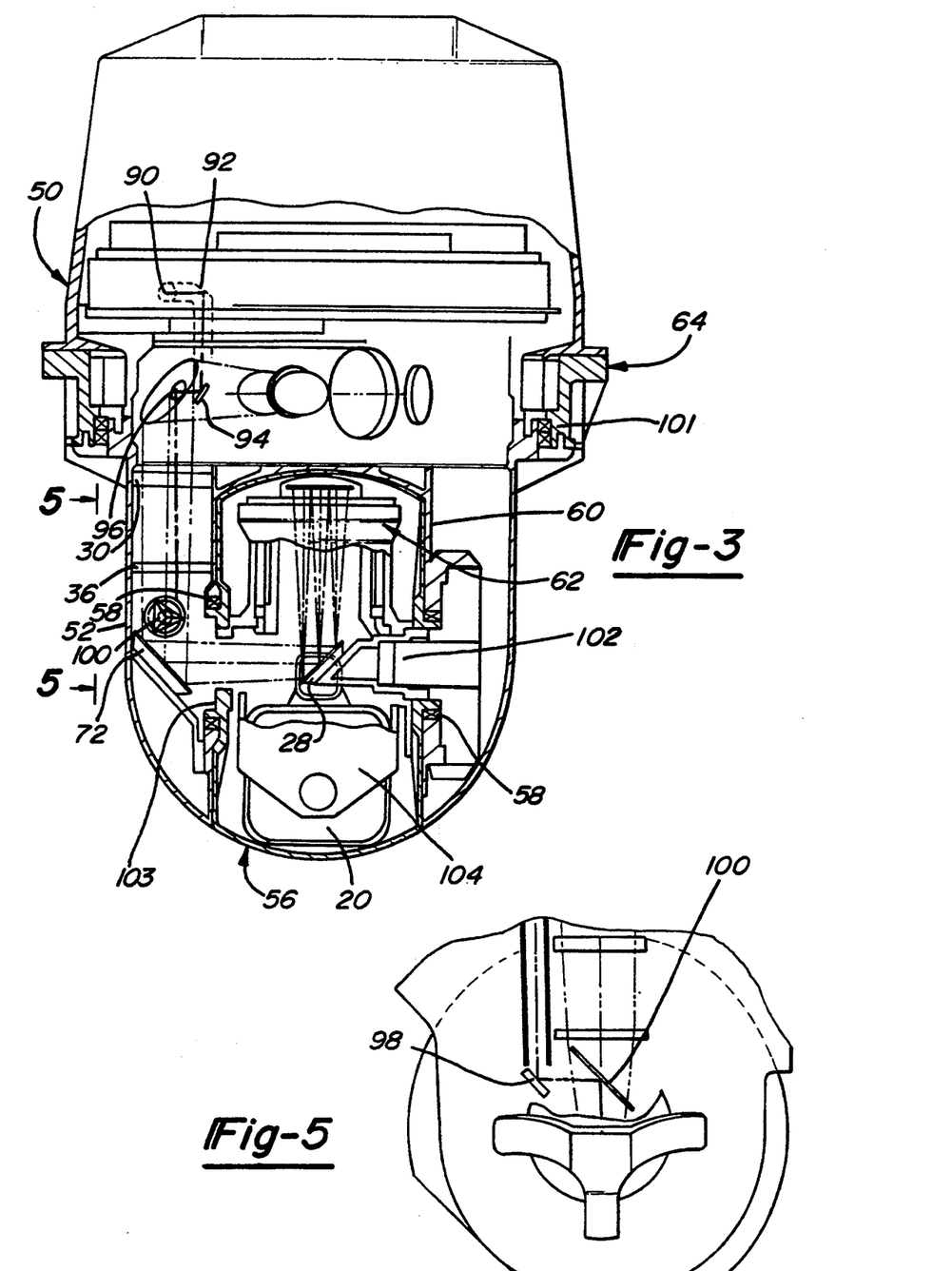
FIG. 3 is a diagrammatic rear view of a turret gimbal assembly in accordance with the present invention.
FIG. 5 is an exploded view of FIG. 3 in the area in the direction of arrows 5.
Figures 4, 6:
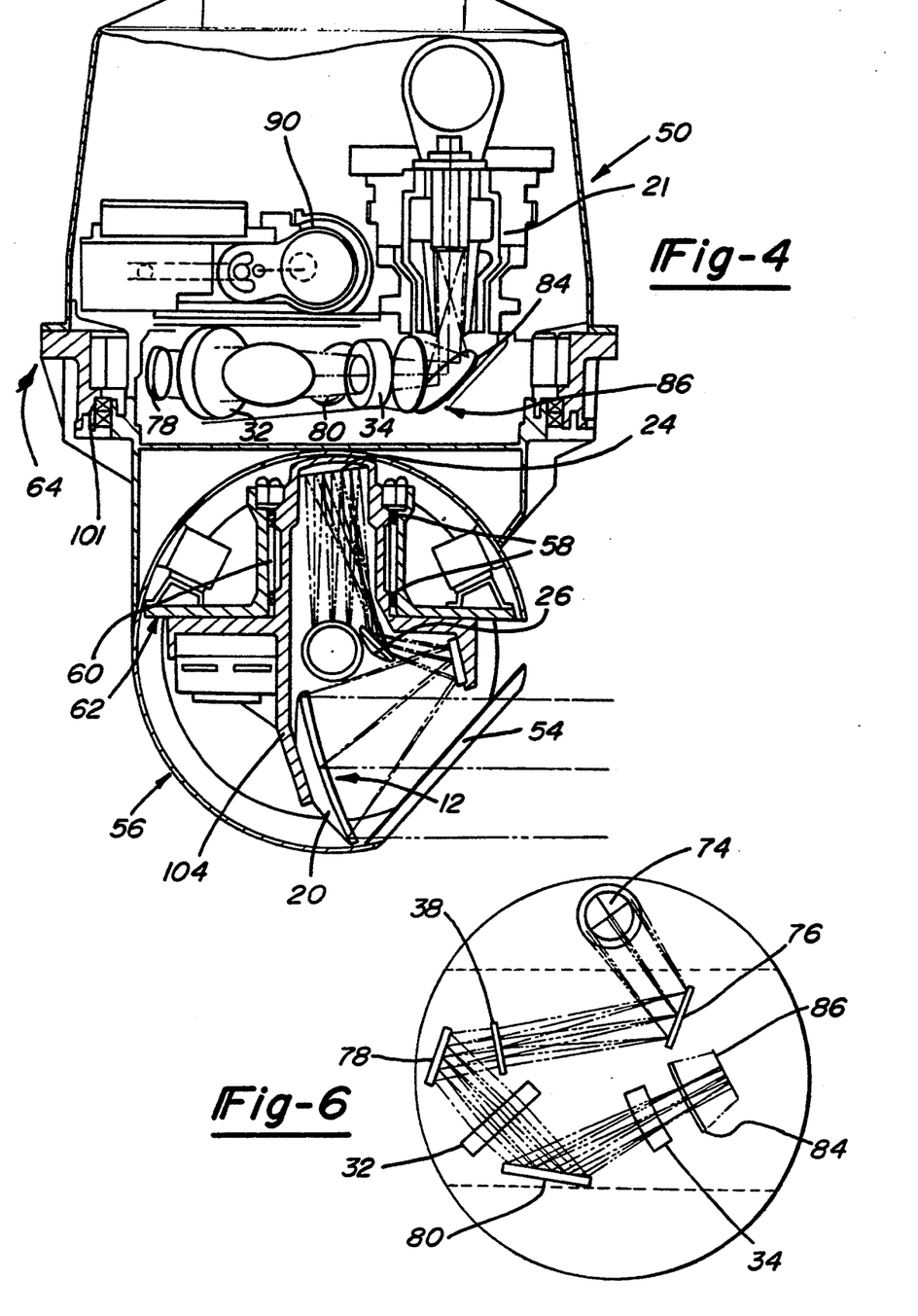
FIG. 4 is a view like FIG. 3 rotated 90°.
FIG. 6 is a schematic view of a portion of the imaging optics in the turret of FIG. 4.
Figure 7:
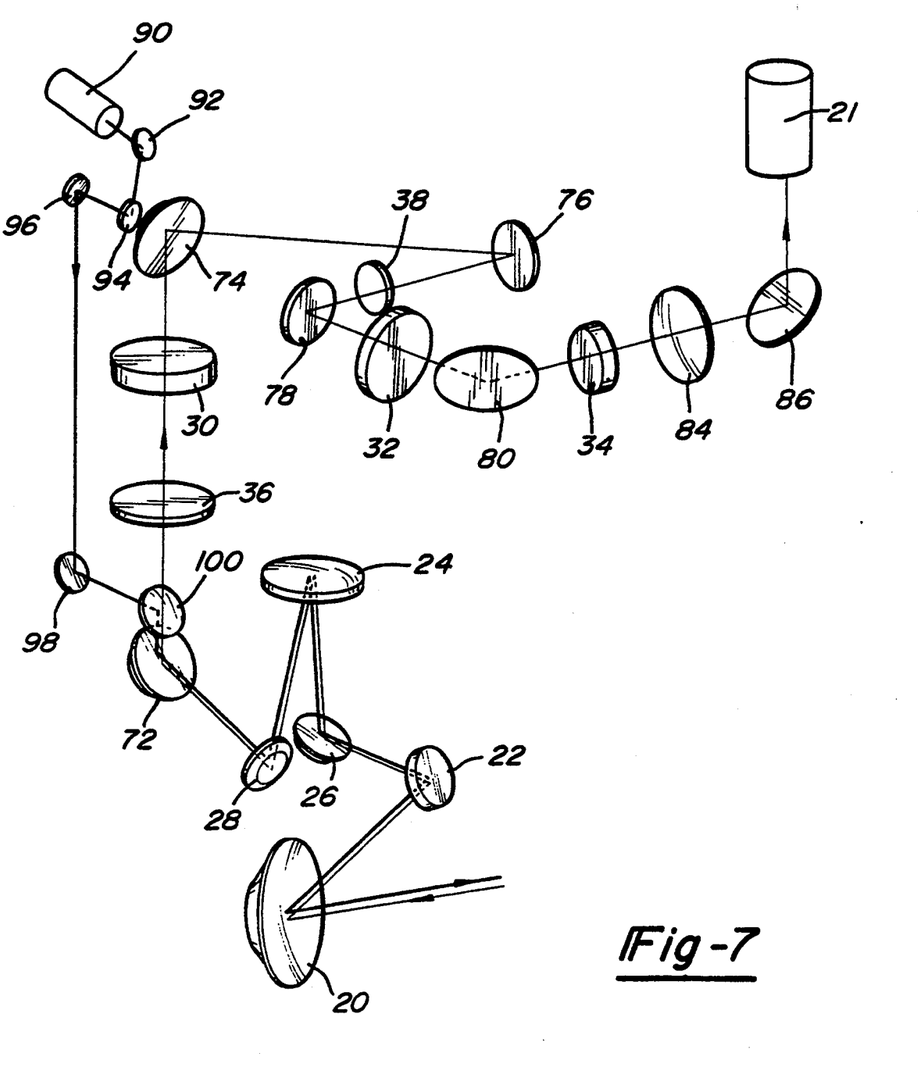
FIG. 7 is a perspective diagrammatic view of the optical elements of the turret gimbal assembly of FIG. 3.

Another feature of the invention is the arrangement of the telescope optical system 12, including its folding, which enables cross axis motion of the telescope 12 without the use of a half angled mirror. Thus, the telescope optical path, starting from a horizontal direction, best illustrated in FIGS. 4 and 7, first strikes the primary mirror 20. From the primary mirror 20, the energy is directed angularly upwardly to the secondary mirror 22. From the secondary mirror 22, the energy is directed angularly upwardly to the 45° fold mirror 26. From the fold mirror 26, the energy is directed to the tertiary mirror 24. The tertiary mirror 24 directs the energy vertically downward perpendicular to the incoming path, as best seen in FIGS. 4 and 7. The second fold mirror 28 in the telescope, which is supported by the fine elevation gimbal, is placed along the vertical path from the tertiary mirror 24 to direct the energy path along the elevation axis, as best seen in FIGS. 3 and 7. This arrangement enables the telescope to rotate about the final leg of the optical path which is perpendicular to the elevation axis without the need of a half angled mirror. There is image rotation produced in the three mirror arrangement which may be corrected by derotating the detector assembly or by adding a delta prism, other mirrors or a Pechan prism or any other type of system may be utilized to eliminate the derotation.

The energy is reflected from the fold mirror 28 to fold mirror 72 in the housing, which, in turn, reflects the energy vertically upward towards the top half of the turret 50. As the beam moves vertically upwardly, it passes through lenses 30 and 36 which are positioned in the beam path. The lens 36 may be movable in and out of the beam path by an electro-mechanical or a manual mechanism. After reflecting from another 45° fold mirror 74, the beam moves horizontally to another fold mirror 76. The beam is reflected towards an additional fold mirror 78 where the lens 38 is positioned between the two fold mirrors 76 and 78. The lens 38 is likewise rotatable in and out of the beam by an electro-mechanical or manual means. After reflecting from the fold mirror 78 to an additional fold mirror 80, the beam passes through the lens 32. From the last fold mirror 82, the beam passes through the third lens 34 through a reflective warm stop 84, as best seen in FIGS. 6 and 7.

The beam is reflected upwards by means of a fold mirror 86, as best seen in FIGS. 4 and 7, to the detector 21. As mentioned above, the detector 21 may be rotatable to take out the derotation. Thus, the energy from the viewed scene is reflected through the turret to the detector 21.

An output laser beam generator 90 which generates an output laser beam for designation purposes is also mounted in the turret 50. The means 90 for generating the laser beam is positioned in the top half of the turret 50. A laser beam is generated and directed horizontally towards a fold mirror 92. The fold mirror 92 directs the beam vertically downward to an additional fold mirror 94 which directs the beam horizontally to the fold mirror 96. The output laser beam is then directed vertically parallel to the input beam to a fold mirror 98 as seen in FIGS. 5 and 7. At fold mirror 98, the beam is reflected horizontally into a dichroic beam combiner 100 which, in turn, reflects the beam enabling a high percentage portion of the output laser beam to be reflected through the mirrors 20, 22, 24 of the three mirror anastigmat telescope 12. The output beam reflects from the beam combiner 100 into the fold mirror 28 positioned on the fine elevation gimbal. From the fold mirror 28, the output laser beam is reflected to the tertiary mirror 24, fold mirror 26, secondary mirror 22 and then the primary mirror 20 and then out toward the scene.

Thus, the invention incorporates, in a single hardware package, a common sensor which may be utilized for staring and acquisition functions, which also provides designation functions through a common telescope. Also, a visible sensor may be utilized in the turret providing an additional function.

Thus, the gimbal turret sensor offers simplicity as well as a compact turret arrangement that is well suited for aircraft needs for a targeting sensor/laser designator. The common aperture shared telescope with infrared and laser with the potential of adding visible sensors, all sharing the same telescope offers the most compact arrangement of these systems that may be achieved. Additional applications would include helicopters, retro-fitting updating present sensors and fixed wing aircraft, RPVs, and possible commercial aircraft without the laser. The lower hemispheric coverage of the turret makes it ideally suited to all airborne applications.

It should be understood that while this invention has been described in connection with the particular example hereof, that various modifications, alterations, variations and changes of the present embodiment can be made after having the benefit of the study of the specification, drawings and subjoined claims.

What is claimed is:

1. A dual field of view multi wavelength sensor comprising:

an afocal three-mirror anastigmat telescope for providing a magnified unobscured image of a scene, said three mirror anastigmat positioned to receive rays from the viewed scene;

imager elements provided to receive rays from said three mirror anastigmat for providing dual field of view imagery of the viewed scene, said imager elements including a triplet and pair of optical elements, said triplet of optical elements positioned for providing a first field of view and said pair of optical elements removably positioned for providing a second field of view.

2. The dual field of view multi wavelength sensor as set forth in claim 1, wherein said first field of view is a narrow field of view.

3. The dual field of view multi wavelength sensor as set forth in claim 1, wherein said second field of view is a wide field of view.

4. The dual field of view multi wavelength sensor as set forth in claim 1, wherein said triplet of optical elements includes three positive power infrared optical elements.

5. The dual field of view multi wavelength sensor as set forth in claim 4, wherein one of said triplet of optical elements includes at least one diffractive optical surface.

6. The dual field of view multi wavelength sensor as set forth in claim 1, wherein said pair of optical elements includes a positive and a negative power infrared lens.

7. The dual field of view multi wavelength sensor as set forth in claim 1, further comprising an output laser beam generator associated with said afocal three mirror anastigmat such that an output laser beam is reflected from the sensor to the viewed scene.

* * * * *